(12) United States Patent
Fowler

(10) Patent No.: US 6,735,607 B2
(45) Date of Patent: May 11, 2004

(54) TRANSPARENT DATA ACCESS AND INTERPOLATION APPARATUS AND METHOD THEREFOR

(75) Inventor: Thomas L. Fowler, Goodyear, AZ (US)

(73) Assignee: Lockheed Martin Corporation, Goodyear, AZ (US)

(*) Notice: Subject to any disclaimer, the term of this patent is extended or adjusted under 35 U.S.C. 154(b) by 478 days.

(21) Appl. No.: 09/872,206

(22) Filed: Jun. 2, 2001

(65) Prior Publication Data

US 2003/0055853 A1 Mar. 20, 2003

(51) Int. Cl.$^7$ ............... G06F 1/02; G06F 7/38
(52) U.S. Cl. .................. 708/270; 708/290
(58) Field of Search ............... 708/270–276, 708/290, 319

(56) References Cited

U.S. PATENT DOCUMENTS

| | | | |
|---|---|---|---|
| 3,965,342 A | 6/1976 | Constant | 235/156 |
| 4,001,565 A | 1/1977 | Kawai | 235/152 |
| 4,313,173 A | 1/1982 | Candy et al. | 364/723 |
| 4,709,343 A * | 11/1987 | Van Cang | 708/301 |
| 4,757,465 A | 7/1988 | Hakoopian et al. | 364/723 |
| 4,841,462 A | 6/1989 | Vigarié et al. | 364/723 |
| 4,970,674 A | 11/1990 | White | 364/726 |
| 5,113,362 A | 5/1992 | Harston et al. | 364/723 |
| 5,117,385 A * | 5/1992 | Gee | 708/319 |
| 5,198,906 A | 3/1993 | Yamashita | 358/213.17 |
| 5,224,063 A | 6/1993 | Matsunaga | 364/726 |
| 5,255,216 A * | 10/1993 | Blanz et al. | 708/625 |
| 5,359,551 A * | 10/1994 | Pickett | 708/270 |
| 5,418,907 A | 5/1995 | Ohki | 395/166 |
| 5,548,709 A | 8/1996 | Hannah et al. | 395/164 |
| 5,563,816 A * | 10/1996 | Golla et al. | 708/319 |
| 5,684,981 A * | 11/1997 | Jones | 708/290 |
| 5,706,481 A | 1/1998 | Hannah et al. | 395/519 |
| 5,740,089 A | 4/1998 | Menoff et al. | 364/723 |
| 5,768,171 A | 6/1998 | Chow | 364/765 |
| 5,862,059 A * | 1/1999 | Matula et al. | 708/270 |
| 5,922,043 A | 7/1999 | Mais | 708/290 |
| 5,999,113 A | 12/1999 | Kiriyama et al. | 341/111 |
| 5,999,581 A * | 12/1999 | Bellaouar et al. | 375/377 |
| 6,223,192 B1 * | 4/2001 | Oberman et al. | 708/270 |
| 6,243,729 B1 * | 6/2001 | Staszewski | 708/319 |

* cited by examiner

Primary Examiner—Tan V. Mai
(74) Attorney, Agent, or Firm—Meschkow & Gresham, P.L.C.

(57) ABSTRACT

An apparatus (20) and method (22) for transparently accessing and interpolating data are provided. Consecutive data values (24) of a function are generated and indexed. Even-indexed data values (24) are stored in an even-indexed table (30) and odd-indexed data values (24) are stored in an odd-indexed table (32). Adjacent-indexed data values (24) are acquired substantially simultaneously from even- and odd-indexed tables (30,32) with the first-indexed value ($G_n$) extracted from the even-indexed table (30) when an integral portion ($A_{[N]}$) of a memory address ($A_{[N+F]}$) is even and from the odd-indexed table (32) when the integral portion ($A_{[N]}$) is odd. A fractional portion ($A_{[F]}$) of the memory address ($A_{[N+F]}$) is converted into an incremental value ($\Delta$). An interpolation circuit (102) then produces an output data value ($G_{Out}$) as a sum of the first-indexed value ($G_n$) plus a product of the incremental value ($\Delta$) times a difference of the second-indexed value ($G_{n+1}$) less the first-indexed value ($G_n$).

21 Claims, 7 Drawing Sheets

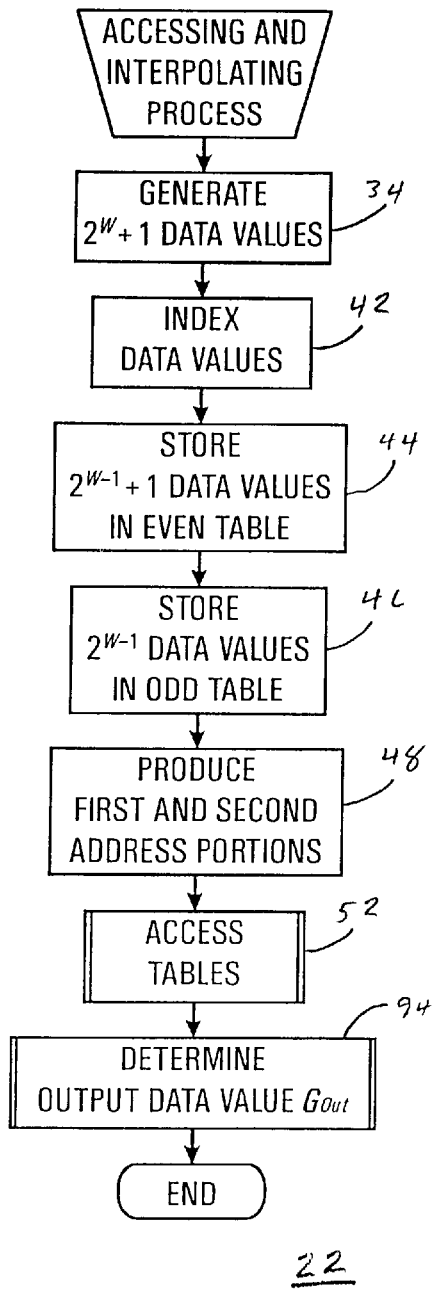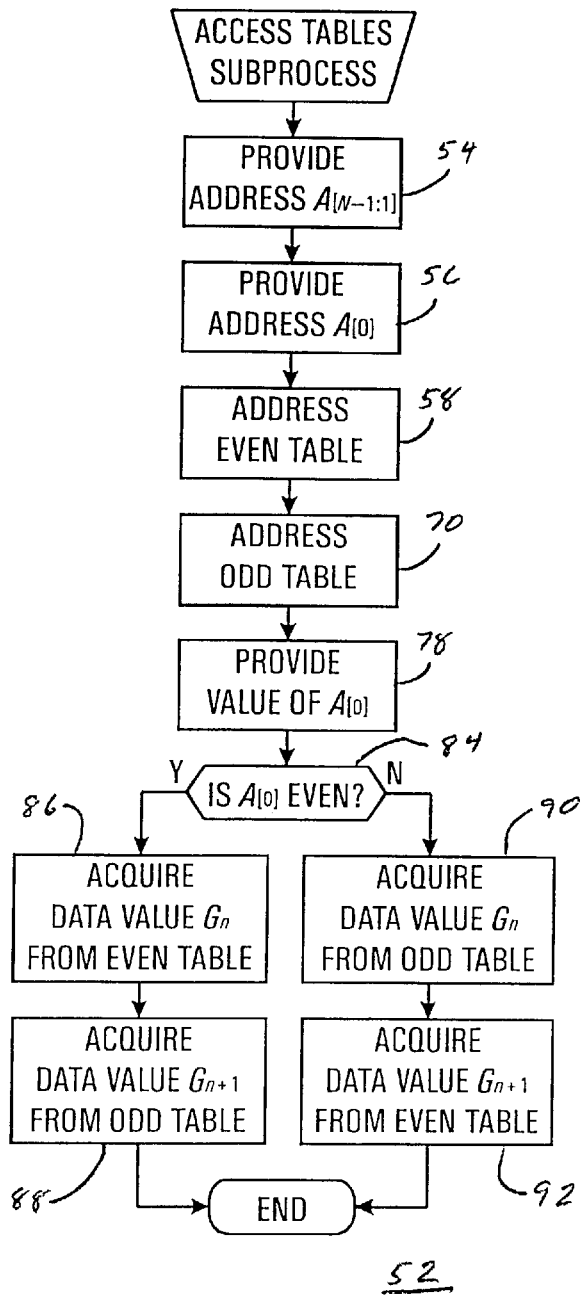
FIG. 2
FIG. 11

| Emulated Table: $V = 16, 2^V = 65{,}536$ | | | $R_W \cdot O_I / O_V = R_I =$ | $A_n$ | $A_f$ |
|---|---|---|---|---|---|
| $O_I$ | Data Value | | | | |
| 0 | cos(0) | | 1024 · 0 / 65536 = | 0 | 0/64 |
| 1 | cos(π/65536) | | 1024 · 1 / 65536 = | 0 | 1/64 |
| 2 | cos(2π/65536) | | 1024 · 2 / 65536 = | 0 | 2/64 |
| ... | ... | | ... | ... | ... |
| 62 | cos(62π/65536) | | 1024 · 62 / 65536 = | 0 | 62/64 |
| 63 | cos(63π/65536) | | 1024 · 63 / 65536 = | 0 | 63/64 |
| 64 | cos(64π/65536) | | 1024 · 64 / 65536 = | 1 | 0/64 |
| 65 | cos(65π/65536) | | 1024 · 65 / 65536 = | 1 | 1/64 |
| ... | ... | | ... | ... | ... |
| 6423 | cos(6423π/65536) | | 1024 · 6423 / 65536 = | 100 | 23/64 |
| 6424 | cos(6424π/65536) | | 1024 · 6424 / 65536 = | 100 | 24/64 |
| 6425 | cos(6425π/65536) | | 1024 · 6425 / 65536 = | 100 | 25/64 |
| ... | ... | | ... | ... | ... |
| 13548 | cos(13548π/65536) | | 1024 · 13548 / 65536 = | 211 | 44/64 |
| 13549 | cos(13549π/65536) | | 1024 · 13549 / 65536 = | 211 | 45/64 |
| 13550 | cos(13550π/65536) | | 1024 · 13550 / 65536 = | 211 | 46/64 |
| ... | ... | | ... | ... | ... |
| 65533 | cos(65533π/65536) | | 1024 · 65533 / 65536 = | 1023 | 61/64 |
| 65534 | cos(65534π/65536) | | 1024 · 65534 / 65536 = | 1023 | 62/64 |
| 65535 | cos(65535π/65536) | | 1024 · 65535 / 65536 = | 1023 | 63/64 |

FIG. 3

| Even-Indexed Table: $W = 10, 2^W = 1024$ | | |
|---|---|---|
| $A$[T1] | $A_n$ | Data Values |
| 0 | 0 | cos(0) |
| 1 | 2 | cos(2π/1024) |
| ... | ... | ... |
| 49 | 98 | cos(98π/1024) |
| 50 | 100 | cos(100π/1024) |
| 51 | 102 | cos(102π/1024) |
| ... | ... | ... |
| 104 | 208 | cos(208π/1024) |
| 105 | 210 | cos(210π/1024) |
| 106 | 212 | cos(212π/1024) |
| 107 | 214 | cos(214π/1024) |
| ... | ... | ... |
| 510 | 1020 | cos(1020π/1024) |
| 511 | 1022 | cos(1022π/1024) |
| 512 | 1024 | cos(π) |

FIG. 5

| Odd-Indexed Table: $W = 10, 2^W = 1024$ | | |
|---|---|---|
| $A$[T2] | $A_n$ | Data Values |
| 0 | 1 | cos(π/1024) |
| 1 | 3 | cos(3π/1024) |
| ... | ... | |
| 49 | 99 | cos(99π/1024) |
| 50 | 101 | cos(101π/1024) |
| 51 | 103 | cos(103π/1024) |
| ... | ... | |
| 104 | 209 | cos(209π/1024) |
| 105 | 211 | cos(211π/1024) |
| 106 | 213 | cos(213π/1024) |
| 107 | 215 | cos(215π/1024) |
| ... | ... | |
| 510 | 1021 | cos(1021π/1024) |
| 511 | 1023 | cos(1023π/1024) |

FIG. 6

| Emulated Table: $V \approx 6.80736, 2^V = 112$ | | | $R_W \cdot O_I / O_V = R_I = A_n$ | | $A_f$ |
|---|---|---|---|---|---|
| $O_I$ | Data Value | | | | |
| 0 | cos(0) | | 16 · 0 / 112 = | 0  0/7 = | 0/512 |
| 1 | cos(π/112) | | 16 · 1 / 112 = | 0  1/7 ≈ | 73/512 |
| 2 | cos(2π/112) | | 16 · 2 / 112 = | 0  2/7 ≈ | 146/512 |
| 3 | cos(3π/112) | | 16 · 3 / 112 = | 0  3/7 ≈ | 219/512 |
| 4 | cos(4π/112) | | 16 · 4 / 112 = | 0  4/7 ≈ | 293/512 |
| 5 | cos(5π/112) | | 16 · 5 / 112 = | 0  5/7 ≈ | 366/512 |
| 6 | cos(6π/112) | | 16 · 6 / 112 = | 0  6/7 ≈ | 439/512 |
| 7 | cos(7π/112) | | 16 · 7 / 112 = | 1  0/7 = | 0/512 |
| 8 | cos(8π/112) | | 16 · 8 / 112 = | 1  1/7 ≈ | 73/512 |
| ... | ... | | ... | ... ... | ... |
| 89 | cos(89π/112) | | 16 · 89 / 112 = | 12  5/7 ≈ | 366/512 |
| 90 | cos(90π/112) | | 16 · 90 / 112 = | 12  6/7 ≈ | 439/512 |
| 91 | cos(91π/112) | | 16 · 91 / 112 = | 13  0/7 = | 0/512 |
| 92 | cos(92π/112) | | 16 · 92 / 112 = | 13  1/7 ≈ | 73/512 |
| 93 | cos(93π/112) | | 16 · 93 / 112 = | 13  2/7 ≈ | 146/512 |
| 94 | cos(94π/112) | | 16 · 94 / 112 = | 13  3/7 ≈ | 219/512 |
| ... | ... | | ... | ... ... | ... |
| 109 | cos(109π/112) | | 16 · 109 / 112 = | 15  4/7 ≈ | 293/512 |
| 110 | cos(110π/112) | | 16 · 110 / 112 = | 15  5/7 ≈ | 366/512 |
| 111 | cos(111π/112) | | 16 · 111 / 112 = | 15  6/7 ≈ | 439/512 |

FIG. 7

| Reduced Table: $W=4, 2^W=16$ | |
|---|---|
| $A_n$ | Data Value |
| 0 | cos(0) |
| 1 | cos(π/16) |
| 2 | cos(2π/16) |
| 3 | cos(3π/16) |
| 4 | cos(4π/16) |
| 5 | cos(5π/16) |
| 6 | cos(6π/16) |
| 7 | cos(7π/16) |
| 8 | cos(8π/16) |
| 9 | cos(9π/16) |
| 10 | cos(10π/16) |
| 11 | cos(11π/16) |
| 12 | cos(12π/16) |
| 13 | cos(13π/16) |
| 14 | cos(14π/16) |
| 15 | cos(15π/16) |
| 16 | cos(π) |

FIG. 8

| Even-Indexed Table: $W=4, 2^W=16$ | | |
|---|---|---|
| $A_{[T1]}$ | $A_n$ | Data Values |
| 0 | 0 | cos(0) |
| 1 | 2 | cos(2π/16) |
| 2 | 4 | cos(4π/16) |
| 3 | 6 | cos(6π/16) |
| 4 | 8 | cos(8π/16) |
| 5 | 10 | cos(10π/16) |
| 6 | 12 | cos(12π/16) |
| 7 | 14 | cos(14π/16) |
| 8 | 16 | cos(π) |

FIG. 9

| Odd-Indexed Table: $W=4, 2^W=16$ | | |
|---|---|---|
| $A_{[T2]}$ | $A_n$ | Data Values |
| 0 | 1 | cos(π/16) |
| 1 | 3 | cos(3π/16) |
| 2 | 5 | cos(5π/16) |
| 3 | 7 | cos(7π/16) |
| 4 | 9 | cos(9π/16) |
| 5 | 11 | cos(11π/16) |
| 6 | 13 | cos(13π/16) |
| 7 | 15 | cos(15π/16) |

TRANSPARENT DATA ACCESS AND INTERPOLATION APPARATUS AND METHOD THEREFOR

TECHNICAL FIELD OF THE INVENTION

The present invention relates to the field of mathematical interpolators. More specifically, the present invention relates to the use of mathematical interpolators in conjunction with computer memories.

BACKGROUND OF THE INVENTION

A computer memory often contains a table of continuous and/or cyclic data. Such data tables are typically used to provide mathematical functions, such as trigonometric and logarithmic functions. A typical such table may contain sine and/or cosine data for a fast Fourier transform function.

In order to realize a desired degree of accuracy, such tables tend to be large. Large tables require extensive use of computer memory. This increases the on-chip real estate and power consumption, thereby increasing the overall cost of the tables.

Some method is often used to reduce the overall size of the table and of the computer memory in which it is contained. The approach most often taken is that of using a smaller table in conjunction with an interpolator to approximate inter-tabular values.

One problem of conventional table-plus-interpolator schemes is that two sequential data-value accesses need be performed in order to obtain data values above and below the desired value. The interpolator then may interpolate the "correct" value between these two values.

Since the accessing computer must perform two accesses, such double-access schemes are non-transparent. That is, the computer is obliged to recognize the special nature of the table-plus-interpolator circuitry. This recognition is usually made in software.

The replacement of a large table with a smaller table plus an interpolator typically cannot be accomplished without an alteration of the software in order to accomplish the two sequential memory accesses. This inhibits the use of software intended for use with a single large table, thereby limiting the use of table-plus-interpolator schemes.

SUMMARY OF THE INVENTION

Accordingly, an advantage of the present invention is provided by a transparent data access and interpolation apparatus and method therefor.

Another advantage of the present invention is provided by a data access apparatus and method that are transparent to the accessing processor.

Another advantage of the present invention is provided by a data access apparatus and method that are usable with pre-existing software.

Another advantage of the present invention is provided by a data access apparatus and method that obtain two values for interpolation in a single access.

Another advantage of the present invention is provided by a data access and interpolation apparatus that significantly reduces on-chip memory area.

Another advantage of the present invention is provided by a data access and interpolation method that reduces power consumption during access.

The above and other advantages of the present invention are carried out in one form by a method of accessing and interpolating data, wherein the method incorporates producing first and second address portions, generating a plurality of data values of a function, storing a first half of the data values in a first table, storing a second half of the data values in a second table, accessing one of the data values in each of the first and second tables substantially simultaneously in response to said the address portion, and determining an output data value greater than or equal to one of the accessed data values in response to the second address portion.

The above and other advantages of the present invention are carried out in another form by an apparatus for accessing and interpolating data within a set of data values, the apparatus incorporating a first memory circuit containing a first table having a first half of the set of data values and configured to output a first table data value in response to a first address portion, a second memory circuit containing a second table having a second half of the set of data values and configured to output a second table data value in response to said first address portion, a routing circuit coupled to the first and second memories and configured to output a first-indexed data value and a second-indexed data value in response to the first and second table data values, and an interpolation circuit coupled to the routing circuit and configured to produce an output data value that combines the first-indexed data value and the second-indexed data value in response to a second address portion.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a flowchart depicting a process for accessing and interpolating data using the apparatus of FIG. 1 in accordance with a preferred embodiment of the present invention;

FIG. 3 shows an exemplary table having an integral-power-of-two number of data values to be emulated by the apparatus of FIG. 1 using the process of FIG. 2 in accordance with a preferred embodiment of the present invention;

FIG. 5 shows an even-indexed table derived from the reduced table of FIG. 4 and configured for use in the apparatus of FIG. 1 in accordance with a preferred embodiment of the present invention;

FIG. 6 shows an odd-indexed table derived from the reduced table of FIG. 4 and configured for use in the apparatus of FIG. 1 in accordance with a preferred embodiment of the present invention;

FIG. 7 shows an exemplary table having a non-integral-power-of-two number of data values to be emulated by the apparatus of FIG. 1 using the process of FIG. 2 in accordance with a preferred embodiment of the present invention;

FIG. 8 shows a reduced table derived from the emulated table of FIG. 7 in accordance with a preferred embodiment of the present invention;

FIG. 9 shows an even-indexed table derived from the reduced table of FIG. 8 and configured for use in the apparatus of FIG. 1 in accordance with a preferred embodiment of the present invention;

FIG. 10 shows an odd-indexed table derived from the reduced table of FIG. 8 and configured for use in the apparatus of FIG. 1 in accordance with a preferred embodiment of the present invention;

FIG. 11 shows a flowchart depicting a table-access subprocess of the process of FIG. 2 in accordance with a preferred embodiment of the present invention.

DETAILED DESCRIPTION OF THE PREFERRED EMBODIMENTS

Figure 1:
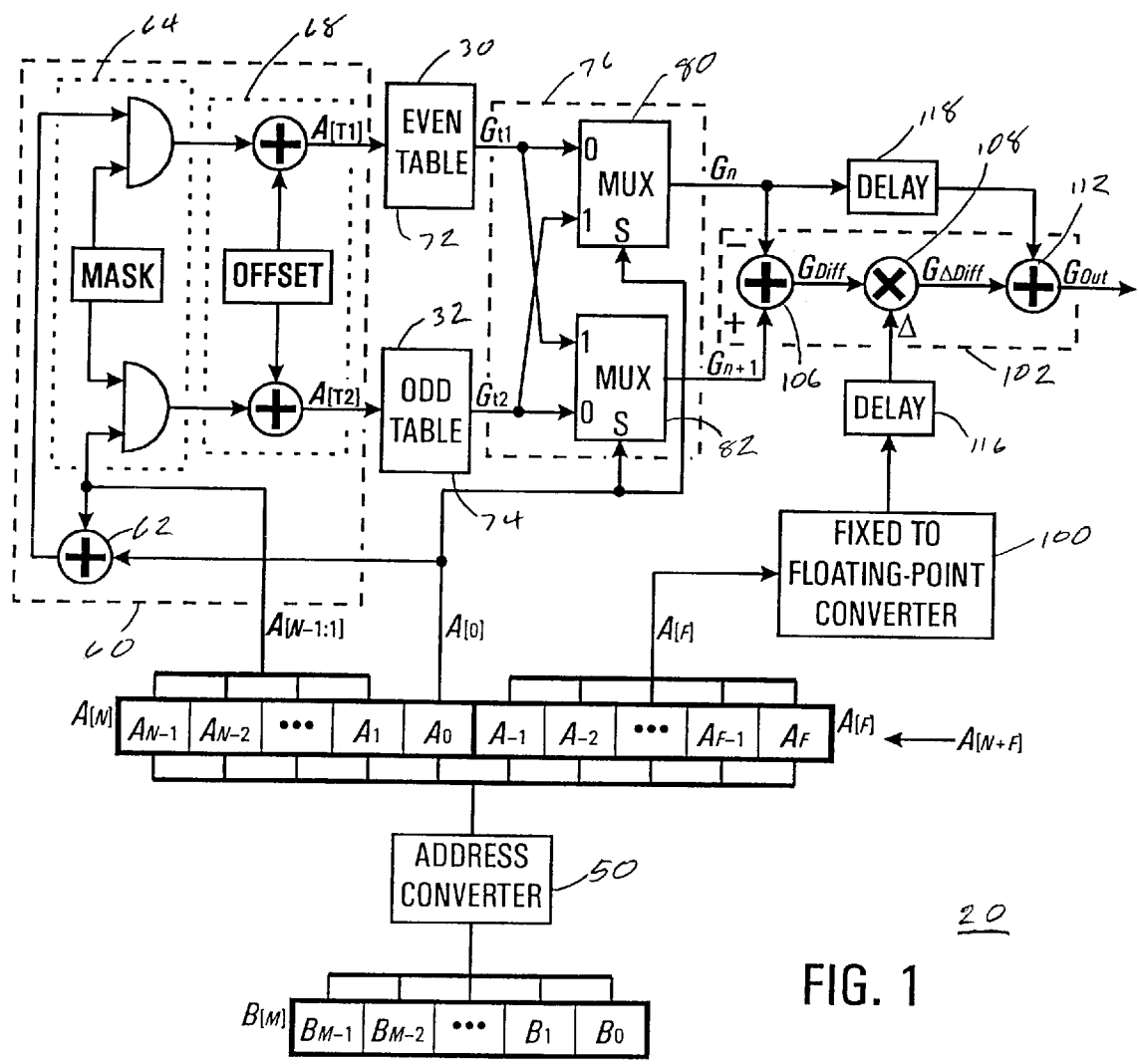
FIG. 1 shows a schematic block diagram depicting a data access and interpolation apparatus in accordance with a preferred embodiment of the present invention.
Figures 4, 12:
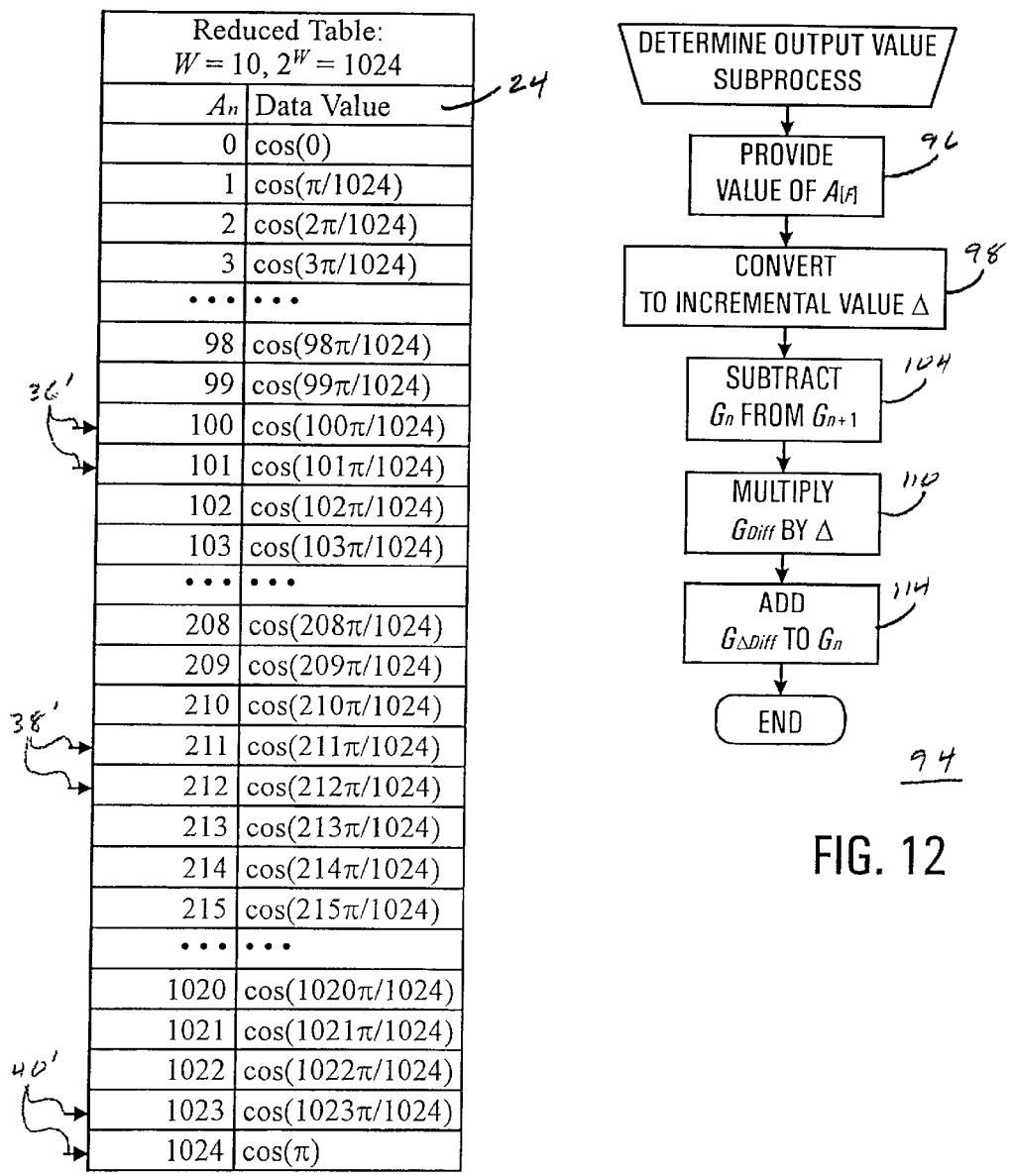
FIG. 4 shows a reduced table derived from the emulated table of FIG. 3 in accordance with a preferred embodiment of the present invention.
FIG. 12 shows a flowchart depicting an output-determining subprocess of the process of FIG. 2 in accordance with a preferred embodiment of the present invention.

FIG. 1 shows a schematic block diagram depicting an apparatus 20 for and FIG. 2 depicts a flowchart depicting a process 22 for transparent data access and interpolation in accordance with a preferred embodiment of the present invention. FIGS. 3 through 6 show exemplary tables for emulation of an integral-power-of-two (IPOT) number of data values 24 by the apparatus of FIG. 1 using the process of FIG. 2 in accordance with a preferred embodiment of the present invention. FIG. 3 shows an emulated table 26' having IPOT data values 24 to be emulated, FIG. 4 shows a reduced table 28' derived from emulated table 26', and FIGS. 5 and 6 show even-and odd-indexed tables 30' and 32' derived from reduced table 28'. Similarly, FIGS. 7 through 10 show exemplary tables for emulation of a non-integral-power-of-two (NPOT) number of data values 24 by the apparatus of FIG. 1 using the process of FIG. 2 in accordance with a preferred embodiment of the present invention. FIG. 7 shows an emulated table 26" having NPOT data values 24 to be emulated, FIG. 8 shows a reduced table 28" derived from emulated table 26", and FIGS. 9 and 10 show even-and odd-indexed tables 30" and 32" derived from reduced table 28". The following discussion refers to FIGS. 1 through 10.

The operation of transparent data access and interpolation apparatus 20 and process 22 therefor is demonstrated herein through the use of two related examples. A first example uses the data depicted in tables 26', 28', 30', and 32'. Table 26' is the table of data to be emulated, i.e., the table that the computer will think it is addressing. In the first example, table 26' (FIG. 3) is composed of $2^V$ data values 24, where V is a positive integer. That is, table 26' has an integral-power-of-two (IPOT) number of data values 24 and is therefore an IPOT table. The first example is hereinafter the IPOT example.

Similarly, a second example uses the data depicted in tables 26", 28", 30", and 32". In this case, table 28" (FIG. 7) is the table of data to be emulated. In the second example, table 26" is composed of $2^V$ data values 24, where V is a positive value but not an integer. That is, table 26" has a non-integral-power-of-two (NPOT) number of data values 24 and is therefore an NPOT table. The second example is hereinafter the NPOT example.

For purposes of identification and simplicity of text, all items common to either both or neither of the IPOT and the NPOT examples have un-accented reference numbers, items peculiar to the IPOT example have prime reference numbers, and items peculiar to the NPOT example have double-prime reference numbers. For example, emulated table 26 references either IPOT emulated table 26' or NPOT emulated table 26" or both.

Data access and interpolation apparatus 20 is substantially transparent to a computer (not shown) to which it is coupled. That is, apparatus 20 appears to the computer as a single memory circuit containing a table of data values 24. Emulated tables 26 (FIGS. 3 and 7) are typical of the tables the computer thinks it is addressing. The use of apparatus 20 allows the use of smaller tables and related circuitry, thereby realizing a significant savings in on-chip real estate over the original (emulated) table and memory circuit, with attendant reductions in power consumption. It is desirable, therefore, that table 26 be replaced by apparatus 20.

In both the IPOT and NPOT examples, tables 26 contain a large number $O_V$ of consecutive data values 24 derived from a function, e.g., cosine values for one-half cycle as may be used in fast Fourier transform (FFT) analyses. In the IPOT example, table 26' contains an integral-power-of-two number of consecutive data values 24. In the example of FIG. 3, V=16, and table 26' has $O_V=2^V=2^{16}=65\,536$ data values 24.

In the NPOT example, table 26" contains a non-integral-power-of-two number of consecutive data values 24. In the example of FIG. 7, V=6.807 354 92 . . . , and table 26" has $O_V=2^V=2^{6.807\,354\,92\cdots}=112$ data values 24.

In a task 34 (FIG. 2), process 22 generates data values 24 for reduced table 28. Through the use of conventional techniques known to those skilled in the art, it may be determined that the data of table 26 may be reduced while maintaining acceptable interpolation accuracy. For simplicity, each of the reduced-table data values 24 may be computed as:

$$R_I = \frac{R_W \cdot O_I}{O_V} \tag{1}$$

where:

$O_I$ is the emulated-table data-value index;

$O_V$ is the number of emulated-table data values;

$R_W$ is the number of reduced-table data values; and $R_I$ is the reduced-table data-value index.

As depicted in FIGS. 3 and 7, reduced-table index $R_I$ is composed of an integral part $A_n$ and a fractional part $A_f$. In the IPOT example (FIG. 3), the data of table 26' may be reduced from $O_V=2^V=2^{16}=65\,536$ data values 24 to $R_W=2^W=2^{10}=1024$ data values 24. This may be demonstrated by an even sample 36' where emulated-table index $O_I=6424$ and an odd sample 38' where emulated-table index $O_I=13\,549$. Using equation (1), even sample 36' computes as:

$$R_I = \frac{R_W \cdot O_I}{O_V} = \frac{1024 \cdot 6424}{65526} = 100\frac{24}{64} \tag{1-1}$$

where integral part $A_n=100$ and fractional part $A_f=24/64$. Similarly, odd sample 38' computes as:

$$R_I = \frac{R_W \cdot O_I}{O_V} = \frac{1024 \cdot 13549}{65526} = 211\frac{45}{64} \tag{1-2}$$

where integral part $A_n=211$ and fractional part $A_f=45/64$.

Fractional part $A_f$ has a resolution of $2^{-6}=1/64$. Since tables 26' and 28' both have an IPOT number of data values 24, the resolution of fractional part $A_f$ is also an integral power of two.

In the NPOT example, the data of table 26" (FIG. 7) is reduced from $O_V=2^V=2^{6.807\,354\,92\cdots}=112$ data values 24 to $R_W=2^W=2^4=16$ data values 24. This may be demonstrated by an even sample 36" where emulated-table index $O_I=90$ and an odd sample 38" where emulated-table index $O_I=93$.

Using equation (1), even sample 36" computes as:

$$R_I = \frac{R_W \cdot O_I}{O_V} = \frac{16 \cdot 90}{211} = 12\frac{6}{7} \qquad (1\text{-}3)$$

where integral part $A_n=12$ and fractional part $A_f=6/7$. Similarly, odd sample 38" computes as:

$$R_I = \frac{R_W \cdot O_I}{O_V} = \frac{16 \cdot 93}{112} = 13\frac{2}{7} \qquad (1\text{-}4)$$

where integral part $A_n=13$ and fractional part $A_f=2/7$.

The integral parts $A_n$ of reduced-table index $R_I$ form the indices of the data values 24 in reduced table 28" (FIG. 8). Reduced table 28" therefore has $R_W=2^W=2^4=16$ data values 24 at a first approximation.

Fractional part $A_f$ has a resolution of $2^{-2.807\ 35\ \cdots}=1/7$. This is not an integral power of two and cannot readily be expressed as a simple binary number. To achieve a reasonable accuracy, therefore, the resolution of the fractional part would desirably be increased to some power of two small enough to achieve the desired accuracy. In the example of FIG. 7, the pseudo power of two is $2^{-9}=1/512$.

Those skilled in the art will appreciate that the hereinbefore discussed methodology for determining data values 24 for reduced table 28 is exemplary only and assumes a common sampling method having the greatest interpolation errors midway between on-curve samples (i.e., samples coincident with the curve) where the function exhibits the greatest curvature. The use of other methods, e.g., a piecewise linear least-squares method, may produce other data values 24 having reduced interpolation errors. Such other methods are well known to those of ordinary skill in the art and are beyond the scope of this discussion. The use of such other methods does not depart from the spirit of the present invention.

Reduced tables 28 contain $R_W=2^W$ data values 24, which is fewer than the $O_V=2^V$ data values 24 of emulated tables 26. Each reduced-table index $R_I$ has an integral part $A_n$ and a fractional part $A_f$. The difference between adjacent values $A_n$ is interpolated by apparatus 20 to provide approximations of the original $O_V$ data values 24. To do this, two adjacent data values 24 $A_n$ and $A_n+1$, are used to provide the interpolation difference.

In the IPOT example, even sample 36' where emulated-table index $O_I=6424$ in emulated table 26' (FIG. 3) produces a reduced-table index $R_I=100^{24}/64$, i.e., where $100 \leq R_I < 101$. Therefore, even sample 36' at reduced table 28' (FIG. 4) is at $A_n=100$ and $A_n+1=101$.

Similarly, odd sample 38' where emulated-table index $O_I=13\ 549$ in table 26' produces a reduced-table index $R_I=211^{45}/64$, i.e., where $211 \leq R_I < 212$. Therefore, odd sample 38' at reduced table 28' is at $A_n=211$ and $A_n+1=212$.

In the NPOT example, even sample 36" where emulated-table index $O_I=90$ in table 26" (FIG. 7) produces a reduced-table index $R_I=12^6/7$, i.e., where $12 \leq R_I < 13$. Therefore, even sample 36" at reduced table 28" (FIG. 8) is at $A_n=12$ and $A_n+1=13$.

Similarly, odd sample 38" where emulated-table index $O_I=93$ in table 26" produces a reduced-table index $R_I=13^2/7$, i.e., where $13 \leq R_I < 14$. Therefore, odd sample 38" at reduced table 28" is at $A_n=13$ and $A_n+1=14$.

Because of this dual-sample property, it is desirable that reduced table contain $R_W+1=2^W+1$ rather than $R_W=2^W$ data values 24. The additional data value 24, where $R_I=2^N$, allows for dual sampling where sample $A_n=2^N-1$ and sample $A_n+1=2^N$. This is demonstrated in FIGS. 3 through 6 (tables 26', 28', 30', and 32') by maximum sample 40'.

In a task 42 (FIG. 2), process 22 indexes the $2^W+1$ data values 24 of reduced tables 28 (FIGS. 4 and 8) from 0 to $2^N$, where each index is integral part $A_n$ of reduced-table index $R_I$ for that data value 24. Therefore, IPOT-example reduced table 28' has $R_W+1=2^W+1=2^{10}+1=1025$ data values 24 indexed from 0 to 1024, and NPOT-example reduced table 28" has $R_W+1=2^W+1=2^4+1=17$ data values 24 indexed from 0 to 16.

Reduced table 28 contains $2^W+1$ data values 24 with consecutive indices from 0 to $2^W$. In a task 44 (FIG. 2), process 22 stores even-indexed ones of data values 24 in even-indexed tables 30. Even-indexed table 30 therefore contains $2^{W-1}+1$ data values having consecutive even indices from 0 to $2^W$.

Similarly, in a task 46 (FIG. 2), process 22 stores odd-indexed ones of data values 24 in odd-indexed tables 32. Odd-indexed table 32 therefore contains $2^{W-1}$ data values having consecutive odd indices from 1 to $2^W-1$.

Those skilled in the art will appreciate that, due to the limitations of flow charts, e.g., FIGS. 2, 11, and 12, a task sequence may be implied that is not a requirement of the present invention. For example, the order in which tasks 44 and 46 are performed is irrelevant to the present invention.

The computer (not shown) to which data access and interpolation apparatus 20 (FIG. 1) is coupled addresses apparatus 20 using a primary address $B_{[M]}$. Because the computer only sees primary address $B_{[M]}$, apparatus 20 is transparent, i.e., the computer believes itself to be addressing emulated table 26 using primary address $B_{[M]}$.

In a task 48, process 22 produces a direct address $A_{[N+F]}$ from primary address $B_{[M]}$. Direct address $A_{[N+F]}$ has an integral address $A_{[N]}$ as a first address portion and a fractional address $A_{[F]}$ as a second address portion.

Primary address $B_{[M]}$ contains M address bits from $B_0$ through $B_{M-1}$, where M is a positive integer. Integral address $A_{[N]}$ represents the integral portion of direct address $A_{[N+F]}$ and contains N address bits from $A_0$ through $A_{N-1}$, where N is a positive integer. Fractional address $A_{[F]}$ represents the fractional portion of direct address $A_{[N+F]}$ and contains F address bits from $A_{-F}$ through $A_{-1}$, where F is a positive integer. Because fractional address $A_{[F]}$ is fractional, i.e., contains the address of a fractional data value, address bit $A_{-1}=2^{-1}=1/2$, address bit $A_{-2}=2^{-2}=1/4$, etc.

In the IPOT example of FIGS. 3 through 6 (tables 26', 28', 30', and 32'), emulated table 26' has $O_V=2^V=2^{16}=65\ 536$ data values 24, reduced table 28' has $R_W=2^W=2^{10}=1024$ data values 24, and fractional part $A_f$ has a resolution of $2^{-F}=2^{-6}=1/64$. Therefore, V=M=16, W=N=10, and F=6. Indeed, where V and W are both integral powers of two:

$$M=N+F. \qquad (2)$$

This allows a direct relationship to exist between the bits of primary address $B_{[M]}$ and direct address $A_{[N+F]}$. This direct relationship is:

| primary address $B_{[M]}$ | | direct address $A_{[N+F]}$ | |
|---|---|---|---|
| $B_{M-1}$ | $B_{15}$ | $A_9$ | $A_{N-1}$ |
|  | $B_{14}$ | $A_8$ |  |
| ... | ... | ... |  |
|  | $B_1$ | $A_1$ |  |

-continued

| primary address $B_{[M]}$ | direct address $A_{[N+F]}$ | |
|---|---|---|
| $B_6$ | $A_0$ | integral address $A_{[N]}$ |
| $B_5$ | $A_{-1}$ | fractional address $A_{[F]}$ |
| $B_4$ | $A_{-2}$ | |
| ... | ... | |
| $B_1$ | $A_{-5}$ | |
| $B_0$ | $A_{-6}$ | $A_{-F}$ |

Because of this direct relationship between primary address $B_{[M]}$ and direct address $A_{[N+F]}$, an optional address converter 50, shown in FIG. 1, is not required.

In the NPOT example of FIGS. 7 through 10 (tables 26", 28", 30", and 32"), however, emulated table 26" has $O^V=2^V=2^{6.807\ 354\ 92\ \cdots}=112$ data values 24, reduced table 28" has $R_W=2^W=2^4=16$ data values 24, and fractional part $A_f$ has a resolution of $2^{-F}=2^{-2.807\ 35\ \cdots}=1/7$. This means that primary address $B_{[M]}$ must have at least seven bits ($M \geq 7$) where values above 112 are ignored. Similarly, fractional address $A_{[F]}$ must have at least three bits ($F \geq 3$), but preferably has more to reduce the rounding error to acceptability. For purposes of simplicity, in the NPOT example of FIG. 7, fractional address $A_{[F]}$ has nine bits (F=9) to allow resolution to the nearest $1/512$, i.e., $1/7 \approx 73/512$, $2/7 \approx 146/512$, $3/7 \approx 219/512$, $4/7 \approx 293/512$, $5/7 \approx 366/512$, and $6/7 \approx 439/512$. Therefore, where V is not an integral power of two:

$$M \leq N+F. \tag{3}$$

Those skilled in the art will appreciate that a value of F=9 is purely arbitrary and was chosen here for simplicity. In actual applications, greater values of F may be used to improve accuracy, e.g., F=16 or F=20.

In both the IPOT and NPOT examples presented herein W is a positive integer, i.e., W=10 for the IPOT example and W=4 for the NPOT example. This results in reduced table 28 having an integral power of two entries, plus 1. In this case, W=N. This is not a requirement of the present invention, and those skilled in the art will appreciate that W, while positive, may not be an integer, i.e., reduced table 28 may have any desired number of entries. In such a case, $W \leq N$.

Optional address converter 50 (FIG. 1) is used in the NPOT example to convert primary address $B_{[M]}$ into direct address $A_{[N+F]}$. Those skilled in the art will appreciate that optional address converter 50 may be any of a plurality of well-know converters, e.g., a simple M by N+F look-up table array, without departing from the spirit of the present invention.

FIG. 11 shows a flowchart depicting a table-access subprocess 52 of process 22 in accordance with a preferred embodiment of the present invention. The following discussion refers to FIGS. 1, 2, 5, 6, and 11.

In subprocess 52, process 22 utilizes an address control circuit 60 (FIG. 1) to access the addressed data values 24 within even- and odd-indexed tables 30 and 32. Even-indexed table 30 contains substantially the even-indexed half of data values 24 of reduced table 28 and odd-indexed table 32 contains substantially the odd-indexed half of data values 24 of reduced table 28. Since each of even- and odd-indexed tables 30 and 32 contains substantially half of reduced table 28, each of even-and odd-indexed tables 30 and 32 is addressable as a half-integral address $A_{[N-1:1]}$, which is integral address $A_{[N]}$ integer-divided by two:

$$A_{[N-1:1]} = int\left(\frac{A_{[N]}}{2}\right). \tag{4}$$

Half-integral address $A_{[N-1:1]}$ is a partial address formed of the N−1 most-significant bits, $A_1$ through $A_{N-1}$, of integral address $A_{[N]}$. A task 54 (FIG. 11) of subprocess 52 provides half-integral address $A_{[N-1:1]}$ to address control circuit 60.

Half-integral address $A_{[N-1:1]}$ cannot differentiate between even-indexed table 30 and odd-indexed table 32. To correct this, $A_{[0]}$ is utilized. Even/odd-integral address $A_{[0]}$ is a partial address formed of the 1 least-significant bit, $A_0$, of integral address $A_{[N]}$. A task 56 (FIG. 11) of subprocess 52 provides even/odd-integral address $A_{[0]}$ to address control circuit 60.

Those skilled in the art will appreciate that the order in which tasks 54 and 56 are performed is irrelevant to the present invention, and the sequence described herein is due to the limitations of flow charts.

A task 58 (FIG. 11) of subprocess 52 addresses even-indexed table 30. That is, task 58 derives an even-table address $A_{[T1]}$ from half-integral address $A_{[N-1:1]}$ and even/odd-integral address $A_{[0]}$ to through address control circuit 60 (FIG. 1) of data access and interpolation apparatus 20.

Within address control circuit 60, task 58 uses a summing circuit 62 to derive the sum of half-integral address $A_{[N-1:1]}$ plus even/odd-integral address $A_{[0]}$. The resultant sum passes through an optional address mask circuit 64 and an optional address offset circuit 68 to become even-table address $A_{[T1]}$.

Similarly, a task 70 of subprocess 52 passes half-integral address $A_{[N-1:1]}$ through optional address mask circuit 64 and optional address offset circuit 68 to become an odd-table address $A_{[T2]}$.

Apparatus 20 incorporates a first memory circuit 72 and a second memory circuit 74, each of which is coupled to address control circuit 60. In the preferred embodiment of FIG. 1, first and second memory circuits 72 and 74 serve solely to contain even- and odd-indexed tables 30 and 32, respectively. Therefore, even- and odd-indexed tables 30 and 32 are considered herein to be synonymous with first and second memory circuits 72 and 74, and even- and odd-table addresses $A_{[T1]}$ and $A_{[T2]}$ are addresses of first and second memory circuits 72 and 74, respectively.

Within address control circuit 60, task 58 (FIG. 11) passes the sum of half-integral address $A_{[N-1:1]}$ plus even/odd-integral address $A_{[0]}$ through optional address mask circuit 64 and optional address offset circuit 68 to become even-table address $A_{[T1]}$. Similarly, a task 70 of subprocess 52 passes half-integral address $A_{[N-1:1]}$ through optional address mask circuit 64 and optional address offset circuit 68 to become an odd-table address $A_{[T2]}$. Those skilled in the art will appreciate that optional address mask circuit 64 and optional address offset circuit 68 are not requirements of the present invention. Address mask circuit 64 and address offset circuit 68 may be used in manners well-known to one of ordinary skill in the art to cause reduced table 28, realized within even- and odd-indexed tables 30 and 32, to become circular. The inclusion or omission of either optional address mask circuit 64 or optional address offset circuit 68 does not depart from the spirit of the present invention. For purposes of simplicity, this discussion shall assume the omission of both optional address mask circuit 64 and optional address offset circuit 68, in which case:

$$A_{[T1]} = A_{[N-1:1]} + A_{[0]}. \tag{5}$$

and $$A_{[T2]} = A_{[N-1:1]} \quad (6)$$

The reason $A_{[T1]}=A_{[N-1:1]}+A_{[0]}$ and $A_{[T2]}=A_{[N-1:1]}$ may be seen by following through address control circuit 60 with the IPOT example. In even sample 36', $A_{[N]}=100$ (FIG. 3). Therefore:

$$A_{[T1]} = int\left(\frac{A_{[N]}}{2}\right) + A_{[0]} = int\left(\frac{100}{2}\right) + 0 = 50, \text{ and} \quad (5\text{-}1)$$

$$A_{[T2]} = int\left(\frac{A_{[N]}}{2}\right) = int\left(\frac{100}{2}\right) = 50. \quad (6\text{-}1)$$

In FIGS. 5 and 6, it may be seen that task 58 (FIG. 11) addresses even-indexed table 30' at $A_{[T1]}=50$ where $A_{[N]}=100$, and task 70 addresses odd-indexed table 32' at $A_{[T2]}=50$ where $A_{[N]}=101$. Therefore, $A_n=100$ and $A_n+1=101$. An even-table data value $G_{t1}$ is the $A_n$ data value and an odd-table data value $G_{t2}$ is the $A_n+1$ data value.

Similarly, in odd sample 38', $A_{[N]}=211$ (FIG. 3). Therefore:

$$A_{[T1]} = int\left(\frac{A_{[N]}}{2}\right) + A_{[0]} = int\left(\frac{211}{2}\right) + 1 = 106, \text{ and} \quad (5\text{-}2)$$

$$A_{[T2]} = int\left(\frac{A_{[N]}}{2}\right) = int\left(\frac{211}{2}\right) = 105. \quad (6\text{-}2)$$

Task 58 (FIG. 11) addresses even-indexed table 30' at $A_{[T1]}=106$ where $A_{[N]}=212$, and task 70 addresses odd-indexed table 32' at $A_{[T2]}=105$ where $A_{[N]}=211$. Therefore, $A_n=211$ and $A_n+1=212$. Odd-table data value $G_{t2}$ is the $A_n$ data value and even-table data value $G_{t1}$ is the $A_n+1$ data value.

Those skilled in the art will appreciate that the order in which tasks 58 and 70 are performed is irrelevant to the present invention, and the sequence described herein is due to the limitations of flow charts.

Following even- and odd-indexed tables 30 and 32 in apparatus 20 is a routing circuit 76 (FIG. 1) coupled to both first and second memory circuits 72 and 74. In a task 78 (FIG. 11), subprocess 52 provides a value of even/odd-integral address $A_{[0]}$ to routing circuit 76. In the preferred embodiment of FIG. 1, routing circuit 76 is made up of two cross-coupled multiplexers 80 and 82 configured to output a first-indexed (i.e., $A_n$ indexed) data value $G_n$ and a second-indexed (i.e., $A_n+1$ indexed) data value $G_{n+1}$, respectively.

In a query task 84 (FIG. 11), subprocess 52 determines if even/odd-integral address $A_{[0]}$ is even or odd. If task 84 determines that even/odd-integral address $A_{[0]}$ is even, then a task 86 acquires first-indexed data value $G_n$ from even-indexed table 30 and a task 88 acquires second-indexed data value $G_{n+1}$ from odd-indexed table 32. Conversely, if task 84 determines that even/odd-integral address $A_{[0]}$ is odd, then a task 90 acquires first-indexed data value $G_n$ from odd-indexed table 32 and a task 92 acquires second-indexed data value $G_{n+1}$ from even-indexed table 32. That is, $G_n=G_{t1}$ and $G_{n+1}=G_{t2}$ when $A_{[0]}=0$, and $G_n=G_{t2}$ and $G_{n+1}=G_{t1}$ when $A_{[N]}=1$.

Subprocess 52 (FIGS. 2 and 11) is thereby completed and control is returned to process 22 (FIG. 2).

FIG. 12 shows a flowchart depicting an output-determining subprocess 94 of process 22 in accordance with a preferred embodiment of the present invention. The following discussion refers to FIGS. 1, 2, 5, 6, 9, 10, and 12.

In subprocess 94 (FIG. 12), process 22 then utilizes an interpolation circuit 102 (FIG. 1) of apparatus 20 to produce an output data value $G_{Out}$. In a task 96, subprocess 94 provides the value $A_f$ of fractional address $A_{[F]}$ (FIG. 1) to interpolation circuit 102. Fractional address $A_{[F]}$ is made up of bits whose values are negative integral powers of two. That is, fractional address $A_{[F]}$ has value $A_f$ that is always fractional, i.e.:

$$0 \leq A_f < 1. \quad (7)$$

Typically, data values 24 in tables 26, 28, 30, and 32 are expressed as floating-point values, rather than binary values. This being the case, a task 98 of subprocess 94 converts value $A_f$ of binary fractional address $A_{[F]}$ into a floating-point incremental value $\Delta$ in a fixed to floating-point converter 100 of apparatus 20, where:

$$0 \leq \Delta < 1. \quad (8)$$

In interpolation circuit 102 of apparatus 20, a task 104 of subprocess 94 uses a subtracting circuit 106 to subtract first-indexed data value $G_n$ from second-indexed data value $G_{n+1}$ to produce a data-difference value $G_{Diff}$. That is:

$$G_{Diff} = G_{n+1} - G_n. \quad (9)$$

In a multiplying circuit 108 of interpolation circuit 102, a task 110 of subprocess 94 multiplies data-difference value $G_{Diff}$ by incremental value $\Delta$ to produce an interpolated data value $G_{\Delta Diff}$. That is:

$$G_{\Delta Diff} = \Delta \cdot G_{Diff}. \quad (10)$$

In a summing circuit 112 of interpolation circuit 102, a task 114 of subprocess 94 adds interpolated data value $G_{\Delta Diff}$ to first-indexed data value $G_n$ to produce output data value $G_{Out}$. That is:

$$G_{Out} = G_n + G_{\Delta Diff}. \quad (11)$$

This completes subprocess 94 and process 22.

The following discussion follows even sample 36' of the IPOT example from beginning to end.

In emulated table 26' (FIG. 3), even sample 36' indicates a desired data value 24 whose emulated-table index $O_I=6424$. This data value is $$\cos\left(\frac{6424}{65536}\pi\right) = 0.952\ 957\ 956\ 032\ \ldots.$$

Using equation 1, the values $A_n$ and $A_f$ of the reduced-table integral address $A_{[N]}$ and fractional address $A_{[F]}$ may be computed:

$$R_I = \frac{R_W \cdot O_I}{O_V} = \frac{1024 \cdot 6424}{65536} = 100\frac{24}{64} \quad (1\text{-}1)$$

where integral part $A_n=100$ and fractional part $A_f=24/64$. This being an IPOT example, a special relationship exists, where V=M, W=N, and M=N+F=10+6=16, and where primary address $B_{[M]}=6424_D=0001\ 1001\ 0001\ 1000_B$ (sixteen bits), integral address $A_{[N]}=100_D=00\ 0110\ 0100_B$ (ten most-significant bits of primary address $B_{[M]}$), and fractional address $A_{[F]}=0.375_D=0.0110\ 00_B$ (six least-significant bits of primary address $B_{[M]}$). Since $100 \leq R_I < 101$, what will actually be fetched are:

$$A_{[T]} = int\left(\frac{A_{[N]}}{2}\right) + A_{[0]} = int\left(\frac{100}{2}\right) + 0 = 50, \text{ and} \quad (5\text{-}1)$$

$$A_{[T2]} = int\left(\frac{A_{[N]}}{2}\right) = int\left(\frac{100}{2}\right) = 50. \quad (6\text{-}1)$$

That is, the data values $G_{t1}$ and $G_{t2}$ in even- and odd-indexed tables 30' and 32' (FIGS. 5 and 6) whose addresses are $A_{[T1]}$=50 and $A_{[T2]}$=50, respectively. From even-indexed table 30', $$G_{t1} = \cos\left(\frac{100}{1024}\pi\right) = 0.953\ 306\ 040\ 354 \dots.$$

From odd-indexed table 32', $$G_{t1} = \cos\left(\frac{101}{1024}\pi\right) = 0.952\ 375\ 012\ 720 \dots.$$

In this case, $A_{[0]}$=0, so first-indexed data value $G_n$=$G_{t1}$ and second-indexed data value $G_{n+1}$=$G_{t2}$. Using equation 9 to compute data-difference value $G_{Diff}$:

$$\begin{aligned} G_{Diff} &= G_{n+1} - G_n \\ &= 0.952\ 375\ 012\ 720 \dots - 0.953\ 306\ 040\ 354 \dots \\ &= -0.000\ 931\ 027\ 634 \dots \end{aligned} \quad (9\text{-}1)$$

Ignoring fixed versus floating-point conversion so that incremental value $\Delta$=$A_f$=0.375, and using equation 10 to compute interpolated data value $G_{\Delta Diff}$:

$$\begin{aligned} G_{\Delta Diff} &= \Delta \cdot G_{Diff} \\ &= (-0.000\ 931\ 027\ 634 \dots) \cdot 0.375 \\ &= -0.000\ 349\ 135\ 363 \dots \end{aligned} \quad (10\text{-}1)$$

Then using equation 11 to compute output data value $G_{Out}$:

$$\begin{aligned} G_{Out} &= G_n + G_{\Delta Diff} \\ &= 0.953\ 306\ 040\ 354 \dots + (-0.000\ 349\ 135\ 363 \dots) \\ &= 0.952\ 956\ 904\ 991 \dots \end{aligned} \quad (11\text{-}1)$$

Which varies by only −0.000 001 051 041 . . . from the desired emulated value of 0.952 957 956 032 . . . .

Similarly, the following discussion follows odd sample 38' of the IPOT example from beginning to end.

In emulated table 26' (FIG. 3), odd sample 38' indicates a desired data value 24 whose emulated-table index $O_I$=13 549. This data value is $$\cos\left(\frac{13549}{65536}\pi\right) = 0.796\ 388\ 074\ 554 \dots.$$

Using equation 1:

$$R_I = \frac{R_W \cdot O_I}{O_V} = \frac{1024 \cdot 13549}{65536} = 211\frac{45}{64} \quad (1\text{-}2)$$

where integral part $A_n$=211 and fractional part $A_f$=45/64= 0.703 125. Since 211≤$R_I$<212, what will actually be fetched are:

$$A_{[T1]} = int\left(\frac{A_{[N]}}{2}\right) + A_{[0]} = int\left(\frac{211}{2}\right) + 1 = 106, \text{ and} \quad (5\text{-}2)$$

$$A_{[T2]} = int\left(\frac{A_{[N]}}{2}\right) = int\left(\frac{211}{2}\right) = 105. \quad (6\text{-}2)$$

That is, the data values $G_{t1}$ and $G_{t2}$ in even- and odd-indexed tables 30' and 32' (FIGS. 5 and 6) whose addresses are $A_{[T1]}$=106 and $A_{[T2]}$=105, respectively. From even-indexed table 30', $$G_{t1} = \cos\left(\frac{212}{1024}\pi\right) = 0.795\ 836\ 904\ 609 \dots.$$

From odd-indexed table 32', $$G_{t2} = \cos\left(\frac{211}{1024}\pi\right) = 0.797\ 690\ 840\ 943 \dots.$$

In this case, $A_{[0]}$=1, so first-indexed data value $G_n$=$G_{t2}$ and second-indexed data value $G_{n+1}$=$G_{t1}$. Using equation 9 to compute data-difference value $G_{Diff}$:

$$\begin{aligned} G_{Diff} &= G_{n+1} - G_n \\ &= 0.795\ 836\ 904\ 609 \dots - 0.797\ 690\ 840\ 943 \dots \\ &= -0.001\ 853\ 936\ 334 \dots \end{aligned} \quad (9\text{-}2)$$

Using equation 10 to compute interpolated data value $G_{\Delta Diff}$:

$$\begin{aligned} G_{\Delta Diff} &= \Delta \cdot G_{Diff} \\ &= (-0.001\ 853\ 936\ 334 \dots) \cdot 0.703\ 125 \\ &= -0.001\ 303\ 548\ 980 \dots \end{aligned} \quad (10\text{-}2)$$

Then using equation 11 to compute output data value $G_{Out}$:

$$\begin{aligned} G_{Out} &= G_n + G_{\Delta Diff} \\ &= 0.797\ 690\ 840\ 943 \dots + (-0.001\ 303\ 548\ 980 \dots) \\ &= 0.796\ 387\ 291\ 963 \dots \end{aligned} \quad (11\text{-}2)$$

Which varies by only −0.000 000 782 591 . . . from the desired emulated value of 0.796 388 074 554 . . . .

With the NPOT example, the process for obtaining the results is substantially identical to that of the IPOT example, with the exception that the value of the fraction part $A_F$ of reduced-table index $R_I$ is not an integral power of two. The accuracy of the result therefore depends heavily upon the resolution of the integral-power-of-two equivalent of the fractional address $A_{[F]}$. In the NPOT examples herein, a resolution of $2^{-9}$=1/512, where F=9, was used for simplicity. In practice, a resolution of $2^{-16}$=1/65 536 or $2^{-20}$=1/1 048 576 would not be uncommon.

Those skilled in the art will appreciate that certain timing considerations must be made within apparatus 20. For this reason, a first delay circuit 116 has been added to apparatus 20 to effect a delay of incremental value $\Delta$ so that incremental value $\Delta$ and data-difference value $G_{Diff}$ arrive at multiplying circuit 108 substantially simultaneously. Similarly, a second delay circuit 118 has been added to apparatus 20 to effect a delay of first-indexed data value $G_n$ so that first-indexed data value $G_n$ and interpolated data value $G_{\Delta Diff}$ arrive at summing circuit 112 substantially simultaneously. The use of these and/or other timing circuits does not depart from the spirit of the present invention.

In summary, the present invention teaches a transparent data access and interpolation apparatus 20 and method 22 therefor. Apparatus 20 and method 22 reduce power consumption during access. Apparatus 20 significantly reduces on-chip memory area. Method 22 is transparent to the accessing computer (not shown) and obtains two values $A_n$ and $A_n+1$ for interpolation in a single access operation. Being transparent, method 22 is usable with pre-existing software.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of transparently accessing and interpolating data, said method comprising:
   a) producing a first address portion $A_{[N]}$ having N bits and a second address portion $A_{[F]}$ having F bits from a primary address $B_{[M]}$ having M bits, where M, N, and F are positive integers;
   b) generating at least $2^W$ data values of a function, where W is a positive number and $W \leq N$;
   c) storing substantially $2^{W-1}$ of said data values in a first table;
   d) storing substantially $2^{W-1}$ of said data values in a second table;
   e) accessing one of said data values in each of said first and second tables substantially simultaneously in response to said first address portion $A_{[N]}$; and
   f) determining an output data value $G_{Out}$ greater than or equal to one of said data values accessed in said accessing activity e) in response to said second address portion $A_{[F]}$.

2. A method as claimed in claim 1 wherein:
   said generating activity b) generates $2^W+1$ of said data values; and
   said method additionally comprises indexing said data values generated in said generating activity b) with consecutive indices from 0 to $2^W$.

3. A method as claimed in claim 2 wherein:
   said storing activity c) stores substantially $2^{W-1}+1$ of said data values having consecutive even indices from 0 to $2^W$ in said first table; and
   said storing activity d) stores substantially $2^{W-1}$ of said data values having consecutive odd indices from 1 to $2^W-1$ in said second table.

4. A method as claimed in claim 2 wherein said accessing activity e) comprises:
   i) providing an address value $A_n$ of said first address portion $A_{[N]}$;
   j) acquiring a first-indexed data value $G_n$ having an index equal to address value $A_n$ from a first one of said first and second tables; and
   k) acquiring a second-indexed data value $G_{n+1}$ having an index equal to address value $A_n+1$ from a second one of said first and second tables.

5. A method as claimed in claim 4 wherein:
   said acquiring activities j) and k) acquire said first-indexed data value $G_n$ and said second-indexed data value $G_{n+1}$ from said first and second tables, respectively, when address value $A_n$ is an even integer; and
   said acquiring activities j) and k) acquire said first-indexed data value $G_n$ and said second-indexed data value $G_{n+1}$ from said second and first tables, respectively, when address value $A_n$ is an odd integer.

6. A method as claimed in claim 1 wherein said determining activity f) comprises:
   providing an address value of said second address portion $A_{[F]}$;
   converting said address value into an incremental value;
   subtracting a first one of said data values accessed in said accessing activity e) from a second one of said data values accessed in said accessing activity e) to obtain a difference value;
   multiplying said difference value by said incremental value to obtain an interpolated data value; and
   adding said interpolated data value and said first one of said data values obtained in said accessing activity e) to obtain said output data value $G_{Out}$.

7. A method as claimed in claim 1 wherein:
   said generating activity b) generates $2^W+1$ of said data values having consecutive indices from 0 to $2^W$;
   said accessing activity e) comprises providing an address value $A_n$ of said first address portion $A_{[N]}$;
   said accessing activity e) additionally comprises acquiring a first-indexed data value $G_n$ having an index equal to address value $A_n$ from a first one of said first and second tables;
   said accessing activity e) additionally comprises acquiring a second-indexed data value $G_{n+1}$ having an index equal to address value $A_n+1$ from a second one of said first and second tables;
   said determining activity f) comprises providing an address value $A_f$ corresponding to said second address portion $A_{[F]}$;
   said determining activity f) additionally comprises converting said address value $A_f$ into an incremental value $\Delta$, where $0 \leq \Delta < 1$;
   said determining activity f) additionally comprises subtracting said first-indexed data value $G_n$ from said second-indexed data value $G_{n+1}$ to obtaining a data-difference value $G_{Diff}$;
   said determining activity f) additionally comprises multiplying said data-difference value $G_{Diff}$ by said incremental value $\Delta$ to obtain an interpolated data value $G_{\Delta Diff}$; and
   said determining activity f) additionally comprises adding said interpolated data value $G_{\Delta Diff}$ to said first-indexed data value $G_n$ to obtain said output data value $G_{Out}$.

8. A method as claimed in claim 1 wherein:
   said accessing activity e) comprises acquiring a first-indexed data value $G_n$ from said first one of said first and second tables in response to said first address portion $A_{[N]}$;
   said accessing activity e) additionally comprises acquiring a second-indexed data value $G_{n+1}$ from said second one of said first and second tables in response to said first address portion $A_{[N]}$;
   said determining activity f) comprises providing an incremental value $\Delta$ in response to said second address portion $A_{[F]}$, where $0 \leq \Delta < 1$; and
   said determining activity f) additionally comprises producing said output data value $G_{Out}$, where $G_{Out}=G_n+\Delta \cdot (G_{n+1}-G_n)$.

9. A method as claimed in claim 1 wherein:
   said producing activity a) produces said first address portion $A_{[N]}$ having N−1 most-significant bits and 1 least-significant bit;

said generating activity b) generates $2^N+1$ consecutive evenly-spaced ones of said data values having consecutive indices from 0 to $2^N$;

said storing activity c) stores $2^{N-1}+1$ of said data values having consecutive even indices from 0 to $2^N$ in said first table;

said storing activity d) stores $2^{N-1}$ of said data values having consecutive odd indices from 1 to $2^N-1$ in said second table;

said accessing activity e) comprises providing a first partial address $A_{[N-1:1]}$ corresponding to said N−1 most-significant bits of said first address portion $A_{[N]}$;

said accessing activity e) additionally comprises providing a second partial address $A_{[0]}$ corresponding to said 1 least-significant bit of said first address portion $A_{[N]}$;

said accessing activity e) additionally comprises addressing said first table with a first table address $A_{[T1]}$ derived from a sum of said first partial address $A_{[N-1:1]}$ and said second partial address $A_{[0]}$;

said accessing activity e) additionally comprises addressing said second table with a second table address $A_{[T2]}$ derived from said first partial address $A_{[N-1:1]}$; and said accessing activity e) additionally comprises acquiring substantially simultaneously a first-indexed data values $G_n$ from said first table and a second-indexed data value $G_{n+1}$ from said second table when $A_{[0]}=0$.

10. A method as claimed in claim 9 wherein said determining activity f) comprises:

providing an incremental value $\Delta$ in response to said second address portion $A_{[F]}$, where $0 \leq \Delta < 1$; and producing said output data value $G_{Out}$, where $G_{Out} = G_n + \Delta \cdot (G_{n+1} - G_n)$.

11. An apparatus for transparently accessing and interpolating data within a set of at least $2^W$ data values, where W is a positive number, said apparatus comprising:

a first memory circuit containing a first table having $2^{W-1}$ data values from said set of data values, said first memory circuit being configured to output a first table data value $G_{t1}$ in response to a first address portion $A_{[N]}$ having N bits, where N is a positive integer and $N \geq W$;

a second memory circuit containing a second table having $2^{W-1}$ data values from said set of data values, said second memory circuit being configured to output a second table data value $G_{t2}$ in response to said first address portion $A_{[N]}$;

a routing circuit coupled to said first and second memories and configured to output a first-indexed data value $G_n$ and a second-indexed data value $G_{n+1}$ in response to said first and second table data values $G_{t1}$ and $G_{t2}$; and an interpolation circuit coupled to said routing circuit, and configured to produce an output data value $G_{Out}$ greater than or equal to said first-indexed data value $G_n$ in response to a second address portion $A_{[F]}$ having F bits, where F is a positive integers.

12. An apparatus as claimed in claim 11 wherein:

said first table has $2^{W-1}+1$ data values having consecutive even indices of 0 to $2^W$, said $2^W+1$ data values being derived from $2^W+1$ data values having consecutive indices from 0 to $2^W$; and said second table has $2^{W-1}$ data values having consecutive odd indices of 1 to $2^W-1$, said $2^{W-1}$ data values being derived from said $2^W+1$ data values having consecutive indices from 0 to $2^W$.

13. An apparatus as claimed in claim 12 wherein:

a first one of said first and second memories is configured to output a first one of said first and second table data values $G_{t1}$ and $G_{t2}$ having an index equal to an address value $A_n$ of said first address portion $A_{[N]}$; and a second one of said first and second memories is configured to output a second one of said first and second table data values $G_{t1}$ and $G_{t2}$ having an index equal to said address value $A_n+1$.

14. An apparatus as claimed in claim 13 wherein said routing circuit routes said first and second table data values $G_{t1}$ and $G_{t2}$ so that $G_n = G_{t1}$ and $G_{n+1} = G_{t2}$ when address value $A_n$ is even, and $G_n = G_{t2}$ and $G_{n+1} = G_{t1}$ when address value $A_n$ is odd.

15. An apparatus as claimed in claim 11 wherein said apparatus additionally comprises an address control circuit coupled to said first and second memories, wherein said address control circuit produces a first table address $A_{[T1]}$ to address said first memory circuit and a second table address $A_{[T2]}$ to address said second memory circuit, where first table address $A_{[T1]}$ and second table address $A_{[T2]}$ are derived from said first address portion $A_{[N]}$.

16. An apparatus as claimed in claim 15 wherein said first address portion $A_{[N]}$ has N−1 most-significant bits and 1 least-significant bit, and wherein said address control circuit comprises a summing circuit configured to sum a first partial address $A_{[N-1:1]}$ with a second partial address $A_{[0]}$ to produce said first table address $A_{[T1]}$, where first partial address $A_{[N-1:1]}$ corresponds to said N−1 most-significant bits, and second partial address $A_{[0]}$ corresponds to said 1 least-significant bit.

17. An apparatus as claimed in claim 15 wherein said address control circuit comprises one of a masking circuit and an offset circuit.

18. An apparatus as claimed in claim 11 wherein said interpolation circuit comprises:

a subtraction circuit configured to subtract said first-indexed data value $G_n$ from said second-indexed data value $G_{n+1}$ to produce a data-difference value $G_{Diff}$;

a multiplication circuit configured to multiply said data-difference value $G_{Diff}$ by an incremental value $\Delta$ to produce an interpolated data value $G_{\Delta Diff}$, where $\Delta$ is derived from said second address portion $A_{[F]}$ and $0 \leq \Delta < 1$; and a summing circuit configured to add said interpolated data value $G_{\Delta Diff}$ to said first-indexed data value $G_n$ to produce said output data value $G_{Out}$.

19. An apparatus as claimed in claim 11 additionally comprising a fixed to floating-point converter coupled to said interpolation circuit and configured to convert an address value $A_f$ of said second address portion $A_{[F]}$ into an incremental value $\Delta$, where $0 \leq \Delta < 1$.

20. An apparatus as claimed in claim 11 additionally comprising an address converter configured to convert a primary address $B_{[M]}$ having M bits into said first address portion $A_{[N]}$ and said second address portion $A_{[F]}$, where M is a positive integer.

21. A method of transparently accessing and interpolating data, said method comprising:

producing a first address portion $A_{[N]}$ having N bits and a second address portion $A_{[F]}$ having F bits, where N and F are positive integers;

generating $2^W+1$ consecutive evenly spaced data values of a function having consecutive indices from 0 to $2^W$, where W is a positive number and $W \leq N$, storing substantially $2^{W-1}+1$ of said data values having consecutive even indices from 0 to $2^W$ in a first table;

storing substantially $2^{W-1}$ of said data values having consecutive odd indices from 1 to $2^W-1$ in a second table;

providing a first partial address $A_{[N-1:1]}$ corresponding to said N-1 most significant bits of said first address portion $A_{[N]}$;

providing a second partial address $A_{[0]}$ corresponding to said 1 least significant bit of said first address portion $A_{[N]}$;

addressing said first table with a first table address $A_{[T1]}$ derived from as a sum of said first partial address $A_{[N-1:1]}$ plus said second partial address $A_{[0]}$;

addressing said second table with a second table address derived from said first partial address $A_{[N-1:1]}$;

acquiring substantially simultaneously a first-indexed data value $G_n$ and a second-indexed data value $G_{n+1}$ from one of said first and second tables when $A_{[0]}=0$ and from one of said second and first tables when $A_{[0]}=1$, respectively;

providing an incremental value $\Delta$ in response to said second address portion $A_{[F]}$, where $0 \leq \Delta < 1$; and producing an output data value $G_{Out}$, where $G_{Out}=G_n+\Delta \cdot (G_{n+1}-G_n)$.

* * * * *

UNITED STATES PATENT AND TRADEMARK OFFICE
CERTIFICATE OF CORRECTION

PATENT NO.     : 6,735,607 B2
DATED          : May 11, 2004
INVENTOR(S)    : Thomas L. Fowler It is certified that error appears in the above-identified patent and that said Letters Patent is hereby corrected as shown below:

Column 4,
Line 20, replace "$O_v=2^v=2^{26.807\ 354\ 92}$" with -- $O_v=2^v=2^{6.807\ 354\ 92}$ --.

Column 5,
Line 44, replace "24 $A_N$" with -- 24, $A_N$ --.
Lines 48, 53, 57, and 62, replace "$\leqq$" with -- $\leq$ --.

Column 6,
Line 66, replace "$B_1$" with -- $B_7$ --.

Column 7,
Lines 32 and 45, replace "$\leqq$" with -- $\leq$ --.
Lines 22 and 24, replace "$\geqq$" with -- $\geq$ --.

Column 10,
Lines 10 and 19, replace "$\leqq$" with -- $\leq$ --.

Column 11,
Line 66, replace "$\leqq$" with -- $\leq$ --.

Column 13,
Line 24, replace "$\leqq$" with -- $\leq$ --.

Column 14,
Lines 36 and 60, replace "$\leqq$" with -- $\leq$ --.

UNITED STATES PATENT AND TRADEMARK OFFICE
CERTIFICATE OF CORRECTION

PATENT NO. : 6,735,607 B2
DATED : May 11, 2004
INVENTOR(S) : Thomas L. Fowler

It is certified that error appears in the above-identified patent and that said Letters Patent is hereby corrected as shown below:

Column 15,
Line 43, replace "$\geqq$" with -- $\geq$ --.

Column 16,
Lines 45, 53, and 67, replace "$\leqq$" with -- $\leq$ --.

Column 18,
Line 9, replace "$\leqq$" with -- $\leq$ --.

Signed and Sealed this

Thirteenth Day of July, 2004

JON W. DUDAS
*Acting Director of the United States Patent and Trademark Office*